US012650514B2

(12) United States Patent
Yutani

(10) Patent No.: US 12,650,514 B2
(45) Date of Patent: Jun. 9, 2026

(54) ABNORMALITY IDENTIFICATION SYSTEM USING LASER LIGHT, ABNORMALITY IDENTIFICATION METHOD USING LASER LIGHT, AND STORAGE MEDIUM

(71) Applicant: NEC Corporation, Tokyo (JP)

(72) Inventor: Katsuhiro Yutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 18/727,750

(22) PCT Filed: Jan. 20, 2022

(86) PCT No.: PCT/JP2022/001954
§ 371 (c)(1),
(2) Date: Jul. 10, 2024

(87) PCT Pub. No.: WO2023/139719
PCT Pub. Date: Jul. 27, 2023

(65) Prior Publication Data
US 2025/0102674 A1 Mar. 27, 2025

(51) Int. Cl.
*G08B 21/00* (2006.01)
*G01S 7/48* (2006.01)
(Continued)

(52) U.S. Cl.
CPC ............ *G01S 17/89* (2013.01); *G01S 7/4802* (2013.01); *G01S 17/06* (2013.01)

(58) Field of Classification Search
CPC ........ G01S 17/89; G01S 7/4802; G01S 17/06; G01N 21/27; G01N 21/88
(Continued)

(56) References Cited

U.S. PATENT DOCUMENTS 6,119,353 A * 9/2000 Grø nskov ............. G01B 11/16
73/146
2003/0234347 A1 * 12/2003 Akagi .............. G08B 13/19697
250/221
(Continued)

FOREIGN PATENT DOCUMENTS

JP H08-248006 A 9/1996
JP H09318603 A * 12/1997
(Continued)

OTHER PUBLICATIONS

International Search Report for PCT Application No. PCT/JP2022/001954, mailed on Apr. 12, 2022.
(Continued)

*Primary Examiner* — Mark S Rushing
(74) *Attorney, Agent, or Firm* — Sughrue Mion, PLLC

(57) ABSTRACT

The identification system includes: an acquisition circuit that, on the basis of laser light illuminated onto respective positions in a space of interest including the stationary structure, and reflected light of the laser light, acquires position information corresponding to the respective positions and wavelength information based on the wavelength of the reflected light reflected at the respective positions; an identification circuit that identifies an abnormal location among the positions where an abnormality with respect to the stationary structure is occurring, on the basis of the wavelength information; and a monitor that monitors the abnormal location.

8 Claims, 8 Drawing Sheets

(51) Int. Cl.
  *G01S 17/06*       (2006.01)
  *G01S 17/89*       (2020.01)

(58) Field of Classification Search
  USPC ......................................................... 340/557
  See application file for complete search history.

(56)                    References Cited

U.S. PATENT DOCUMENTS

| | | | |
|---|---|---|---|
| 2016/0238534 A1 | 8/2016 | Lau et al. | |
| 2019/0196020 A1* | 6/2019 | Aceti | .................... G01S 7/4815 |
| 2021/0278534 A1* | 9/2021 | Iwasawa | ................. G01S 17/42 |
| 2022/0268941 A1* | 8/2022 | Wakamiya | ............ G01S 7/4802 |
| 2022/0277516 A1* | 9/2022 | Matsunobu | ............... G06T 7/70 |

FOREIGN PATENT DOCUMENTS

| | | |
|---|---|---|
| JP | H11-002680 A | 1/1999 |
| JP | H11-503520 A | 3/1999 |
| JP | 2001-215148 A | 8/2001 |
| JP | 2003-505676 A | 2/2003 |
| JP | 2012-233758 A | 11/2012 |
| JP | 2016-080509 A | 5/2016 |
| JP | 2019-100913 A | 6/2019 |

OTHER PUBLICATIONS

English translation of Written opinion for PCT Application No. PCT/JP2022/001954, mailed on Apr. 12, 2022.
JP Office Action for JP Application No. 2023-574970, mailed on Apr. 15, 2025 with English Translation.

* cited by examiner

Fig.8

ABNORMALITY IDENTIFICATION SYSTEM USING LASER LIGHT, ABNORMALITY IDENTIFICATION METHOD USING LASER LIGHT, AND STORAGE MEDIUM

This application is a National Stage Entry of PCT/JP2022/001954 filed on Jan. 20, 2022, the contents of all of which are incorporated herein by reference, in their entirety.

TECHNICAL FIELD

The present invention relates to, for example, an identification system that enables monitoring of a stationary structure.

BACKGROUND ART

A technique for monitoring a structure by using Light Detection and Ranging (LiDAR) is known. For example, a technique described in PTL 1 detects whether an abnormality occurs on a structure by detecting a vibration speed of the structure by using LiDAR. It is noted that a technique described in PTL 2 is also known as a related technique. Furthermore, as another related technique, a technique described in PTL 3 is also known.

CITATION LIST

Patent Literature

PTL 1: Japanese Unexamined Patent Application Publication No. 2001-215148

PTL 2: Japanese Unexamined Patent Application Publication No. 2003-505676

PTL 3: Japanese Unexamined Patent Application Publication No. H11-002680

SUMMARY OF INVENTION

Technical Problem

In general, when an abnormality occurs in a part of a structure that is supposed to be stationary (hereinafter referred to as a "stationary structure"), such a part may be in motion. For example, a part of a surface member of a stationary structure may be peeled off, and the peeled-off surface member may hang down and sway. In monitoring of a stationary structure, it is required not only to detect an event of occurrence of such an abnormality, but also to identify a location where such an abnormality occurs (hereinafter referred to as "abnormality occurrence location").

However, in the technique described in PTL 1, only presence or absence of abnormality in a structure is detected, and means for identifying the abnormality occurrence location is not provided. Therefore, with the technique described in PTL 1, it is difficult to identify the abnormality occurrence location. As a result, for example, there is a problem that it is difficult to achieve monitoring of an abnormality occurrence location.

In view of the above-mentioned problem, an object of the present invention is to achieve identification of an abnormal location where an abnormality occurs in a stationary structure.

Solution to Problem

The present invention is an identification system including:

an acquisition means for acquiring, based on laser light emitted to each position within a target space including a stationary structure and reflected light of the laser light, position information according to the each position and wavelength information based on a wavelength of the reflected light reflected at the each position;

an identification means for identifying, based on the wavelength information, an abnormal portion where an abnormality occurs in the stationary structure from the positions; and a monitoring means for monitoring the abnormal portion.

The present invention is an identification method including:

acquiring, based on laser light emitted to each position within a target space including a stationary structure and reflected light of the laser light, position information according to the each position and wavelength information based on a wavelength of the reflected light reflected at the each position;

identifying, based on the wavelength information, an abnormal portion where an abnormality occurs in the stationary structure from the positions; and monitoring the abnormal portion.

The present invention is a storage medium storing a program that causes an information processing apparatus to execute:

processing of acquiring, based on laser light emitted to each position within a target space including a stationary structure and reflected light of the laser light, position information according to the each position and wavelength information based on a wavelength of the reflected light reflected at the each position;

processing of identifying, based on the wavelength information, an abnormal portion where an abnormality occurs in the stationary structure from the positions; and processing of monitoring the abnormal portion.

Advantageous Effects of Invention

According to the present invention, an identification system and the like that can realize identify an abnormal portion where an abnormality occurs in a stationary structure can be provided.

BRIEF DESCRIPTION OF DRAWINGS

FIG. 8 is a diagram illustrating an example of an information processing apparatus that implements the identification system and the like according to the first and second example embodiments of the present invention.

EXAMPLE EMBODIMENT

First Example Embodiment

Figure 1:
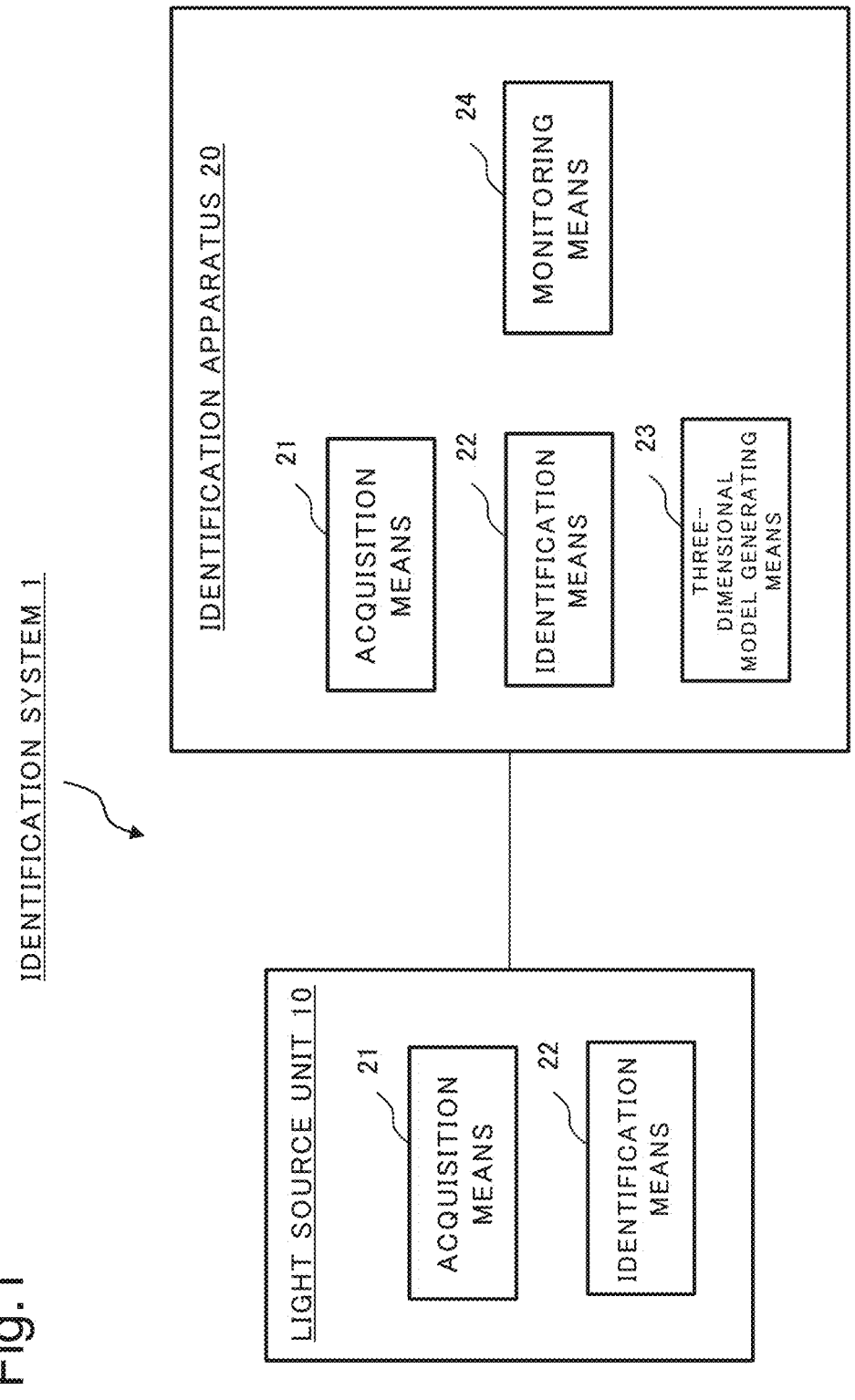
FIG. 1 is a block diagram illustrating a configuration example of an identification system according to a first example embodiment of the present invention.
Figure 2:
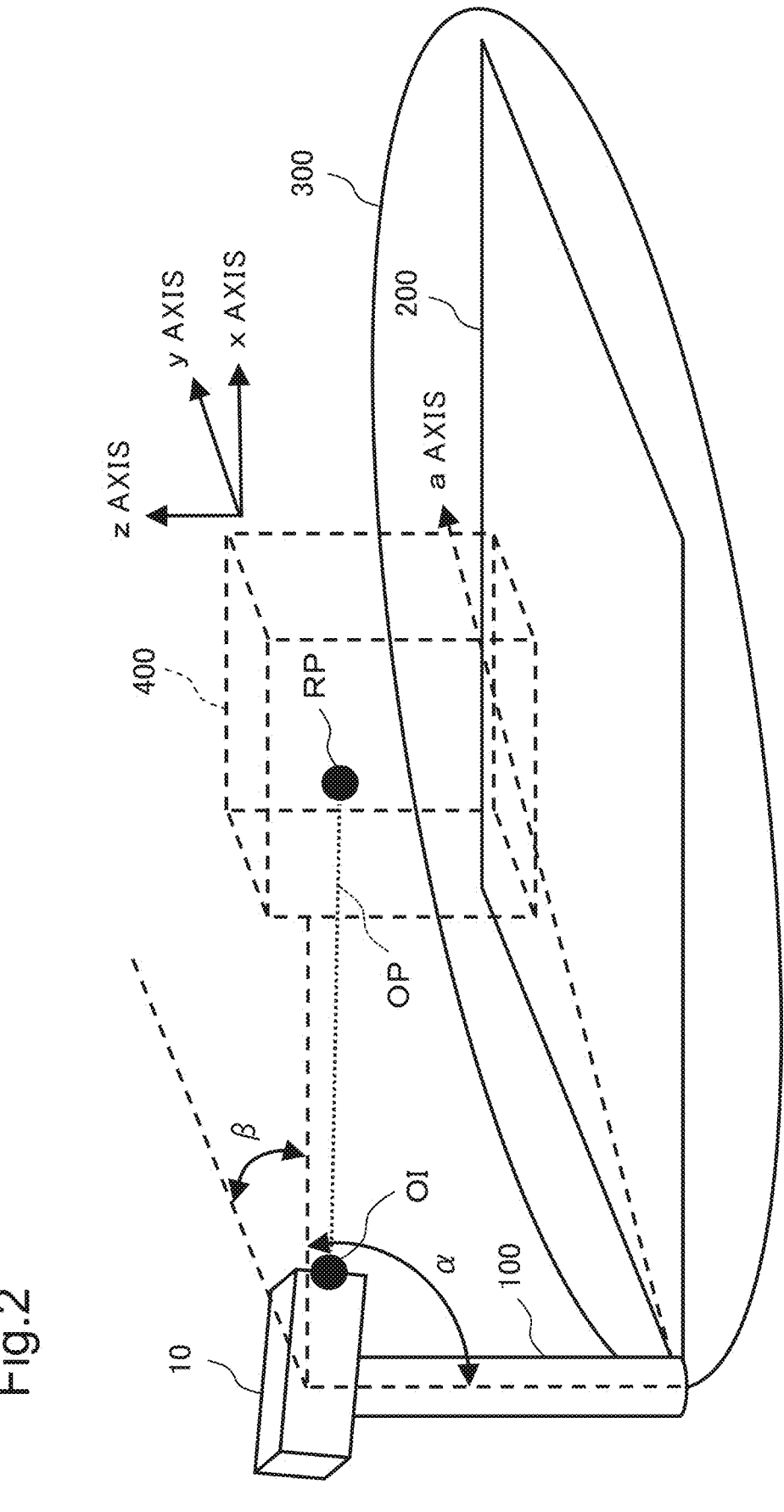
FIG. 2 is a diagram for explaining details of the identification system according to the first example embodiment of the present invention.
Figure 3:
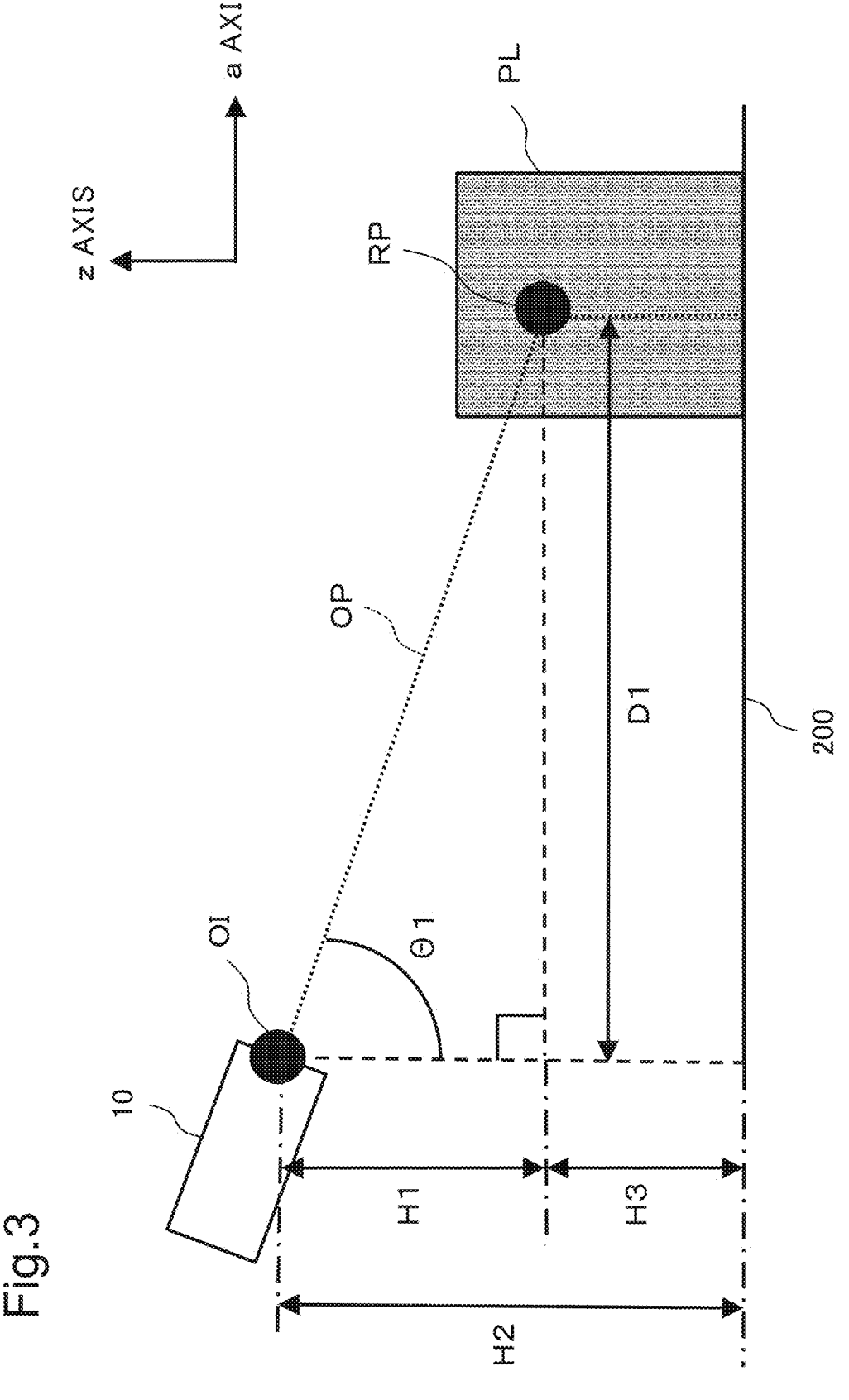
FIG. 3 is a diagram for explaining details of the identification system according to the first example embodiment of the present invention.
Figure 4:
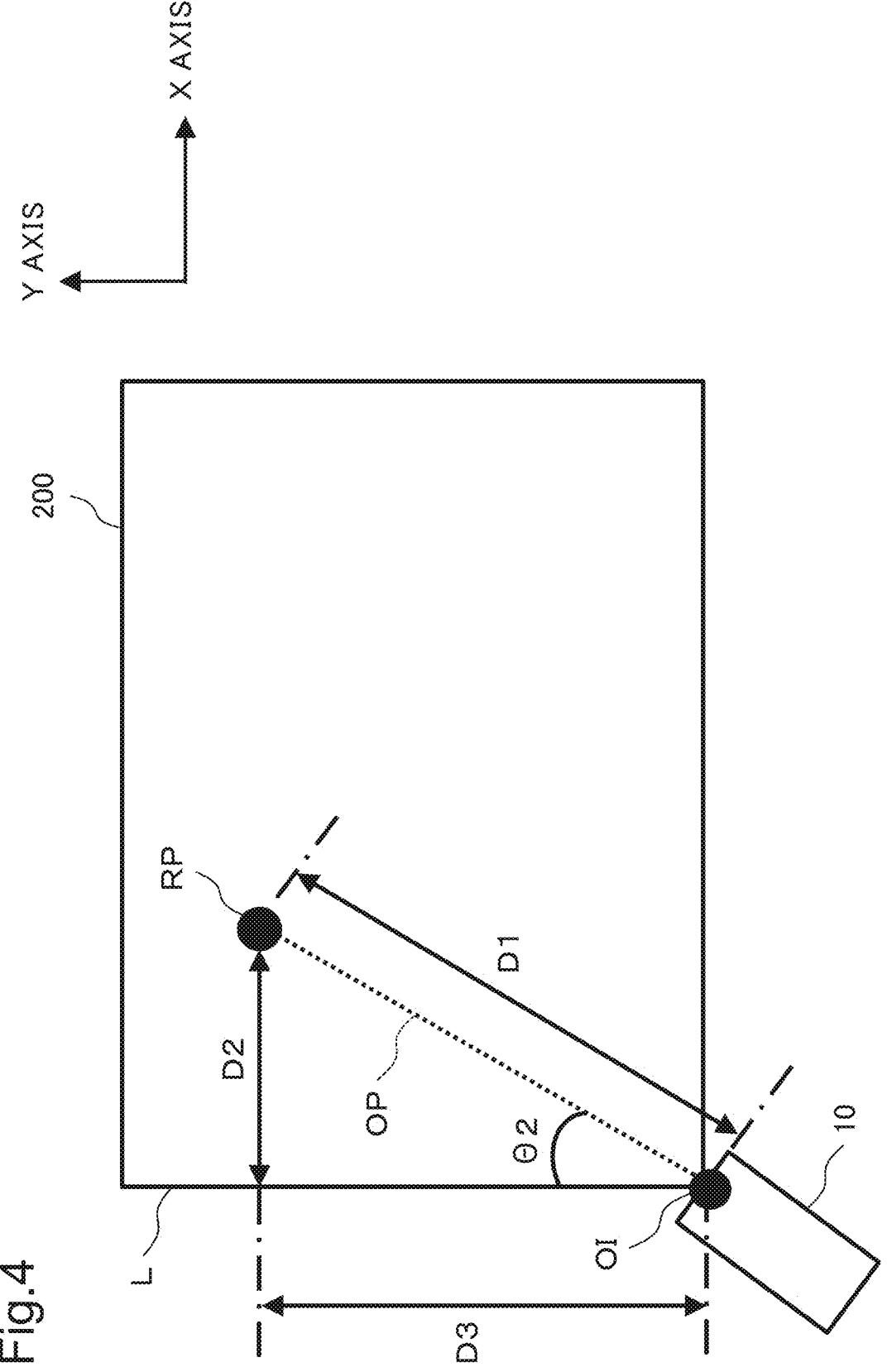
FIG. 4 is a diagram for explaining details of the identification system according to the first example embodiment of the present invention.
Figure 5:
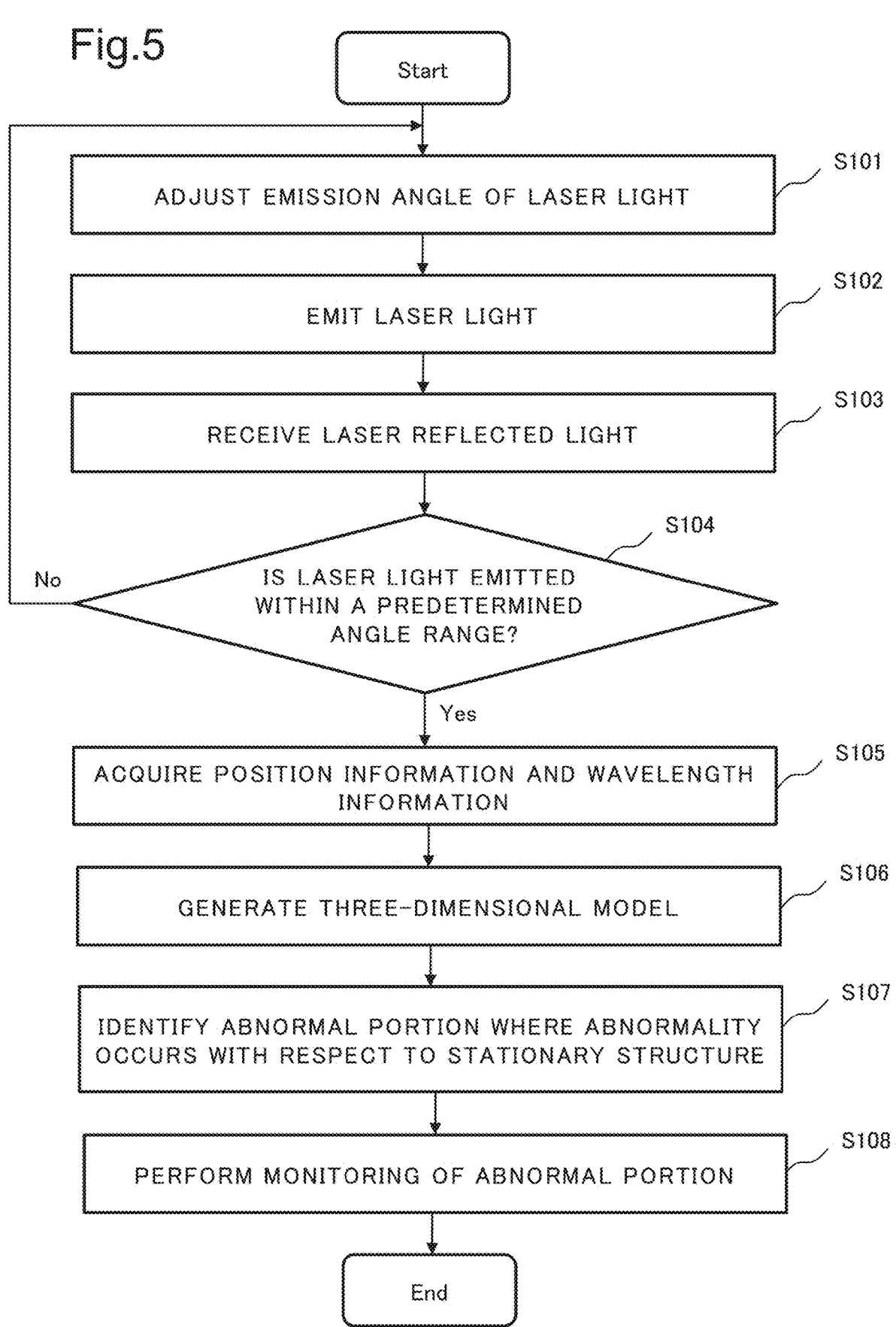
FIG. 5 is a flowchart illustrating an example of operations of the identification system according to the first example embodiment of the present invention.

An identification system 1 according to the first example embodiment is explained with reference to FIG. 1, FIG. 2, FIG. 3, FIG. 4, and FIG. 5. FIG. 1 is a block diagram illustrating a configuration example of the identification system 1. FIG. 2, FIG. 3, and FIG. 4 are diagrams for explaining details of the identification system 1. FIG. 5 is a flowchart for explaining an example of operations of the identification system 1.

The configuration of the identification system 1 is explained. The identification system 1 includes a light source unit 10 and an identification apparatus 20. In FIG. 1, the light source unit 10 and the identification apparatus 20 are provided separately, but may be provided integrally. The light source unit 10 and the identification apparatus 20 can communicate with each other.

The light source unit 10 includes light emission means 11 and light receiving means 13.

The light emission means 11 irradiates a light emission area 300 including a target space 200 in which a stationary structure 400 is arranged with a laser light. Specifically, the laser light is a pulsed laser light. For example, the light emission means 11 emits laser light from an optical input/output terminal OI provided in the light source unit 10, as illustrated in FIG. 2, FIG. 3, and FIG. 4. As a result, the emitted laser light propagates along an optical path OP and enters a reflection point RP of the target object that is present in the target space 200. The optical path OP is a line segment connecting the optical input/output terminal OI and the reflection point RP. In this case, the target space is a land that includes the stationary structure 400 such as a building. Note that stationary structures 400 include a steel tower, a bridge, a utility pole, and the like.

Further, the light receiving means 13 receives the laser light reflected by the stationary structure 400 within the target space 200. Hereinafter, the "laser light reflected by the stationary structure 400 in the target space 200" is referred to as "laser reflected light". For example, in the examples of FIG. 2, FIG. 3 and FIG. 4, the light receiving means 13 receives the laser reflected light from the reflection point RP of the stationary structure 400 through the optical path OP and the optical input/output terminal OI. Furthermore, by changing the direction in which the light source unit 10 emits the laser light as described later, the light receiving means 13 can receive laser reflected light from different reflection points RP.

Next, the identification apparatus 20 is explained. The identification apparatus 20 includes acquisition means 21, identification means 22, three-dimensional model generating means 23, and monitoring means 24.

The acquisition means 21 is explained. The acquisition means 21 acquires position information corresponding to each position irradiated with the laser light, based on the laser light and laser reflected light. Furthermore, the acquisition means 21 acquires wavelength information corresponding to the wavelength of the laser reflected light reflected at each position irradiated with the laser light, based on the laser reflected light. In this case, the laser reflected light refers to the reflected light of the laser light emitted to each position of the target space 200 including the stationary structure 400.

In this case, position information is explained with reference to FIG. 2, FIG. 3, and FIG. 4. FIG. 2 illustrates positional relationship between the light source unit 10 and the target space 200 along x, y, and z axes. Furthermore, FIG. 3 illustrates the positional relationship between the light source unit 10 and the target space 200 along the z-axis and the a-axis. The a-axis is acquired by orthogonally projecting the optical path OP onto the xy plane.

By tilting the light source unit 10 along α direction (vertical direction with respect to the xy plane) illustrated in FIG. 2, the light emission means 11 can emit laser light at a given angle θ1 as illustrated in FIG. 3. For example, as illustrated in FIG. 3, the angle θ1 is an angle formed by a straight line extending vertically downward from the optical input/output terminal OI of the laser light and the optical path OP. The acquisition means 21 can detect the angle θ1 using a gyro sensor (not illustrated) or the like.

The acquisition means 21 calculates the length of the optical path OP from the time from when the laser light is emitted by the light emission means 11 until the laser reflected light is received by the light receiving means 13. Hereinafter, "a time until the laser reflected light is received by the light receiving means 13" is referred to as a "time t". Specifically, the length of the optical path OP is found by multiplying the time t by the speed of light and dividing the acquired value by two. The acquisition means 21 can calculate a difference between the z-coordinate of the optical input/output terminal OI of the laser light and the z-coordinate of the reflection point RP of the laser light (H1 in FIG. 3) by multiplying the length of the optical path OP by cos θ1. Accordingly, the acquisition means 21 acquires the relative position of the reflection point RP on the z-axis with respect to the optical input/output terminal OI.

Furthermore, the acquisition means 21 calculates the length of the line segment D1 of the optical path OP projected onto the xy plane by multiplying the length of the optical path OP by sin θ1. As illustrated in FIG. 4, the line segment D1 is a line segment that connects the optical input/output terminal OI of the laser light to the reflection point RP on the xy plane.

By tilting the light source unit 10 along β direction (parallel to the xy plane) illustrated in FIG. 2, the light emission means 11 can emit laser light at any given angle θ2. For example, the angle θ2 is an angle formed by a reference line L set on the xy plane and the optical path OP, as illustrated in FIG. 4. In the example illustrated in FIG. 4, the reference line L is one of the sides forming the outer periphery of the target space 200. The acquisition means 21 can detect the angle θ2 using a gyro sensor (not illustrated) or the like.

The acquisition means 21 calculates a difference between the x-coordinate of optical input/output terminal OI and the x-coordinate of the reflection point RP (D2 in FIG. 4) by multiplying the length of line segment D1 by sin θ2. The acquisition means 21 also calculates a difference between the y-coordinate of the optical input/output terminal OI and the y-coordinate of the reflection point RP (D3 in FIG. 4) by multiplying the length of the line segment D1 by cos θ2. As a result, the acquisition means 21 acquires the relative position on the x-axis and the relative position on the y-axis of the reflection point RP with respect to the optical input/output terminal OI. The acquisition means 21 stores the acquired relative positions on the respective axes in association with the angles θ1 and θ2.

By changing at least one of the angles θ1 and θ2 by the light source unit 10, the laser light is incident on the reflection point RP at a different position. The light source unit 10 receives the reflected laser light from plurality of reflection points RP within the light emission area 300 by emitting laser light according to plurality of angles θ1 and plurality of angles θ2 defined in advance. Thereby, the acquisition means 21 can acquire the relative positions on the respective axes for each of the plurality of reflection points RP in the target space 200. The acquisition means 21 acquires the relative positions on the respective axes of each of the reflection points RP acquired as described above as position information. Note that the acquisition means 21 may convert the relative positions into absolute positions using a predetermined reference point, and acquire the absolute positions as position information.

Next, wavelength information is explained. The wavelength information is information that indicates the difference between the wavelength of laser light and the wavelength of laser reflected light. When the laser light enters the moving reflection point RP, the wavelength of the reflected laser light changes due to the Doppler effect. That is, the wavelength information is information indicating the amount of wavelength shift due to the Doppler effect.

The light receiving means 13 detects the wavelength of the laser reflected light by coherently detecting the laser reflected light using local light having the same wavelength as the laser light. When the light receiving means 13 receives the reflected light from the reflection point RP, the light receiving means 13 notifies the acquisition means 21 of the wavelength of the reflected light. Furthermore, the acquisition means 21 stores in advance the wavelength of the laser light emitted by the light emission means 11. Thereby, the acquisition means 21 can acquire the wavelength information according to the wavelength of the reflected light. The acquisition means 21 outputs the position information and the wavelength information, which are acquired, to the identification means 22.

The identification means 22 identifies, based on the wavelength information, an abnormal portion where an abnormality with respect to the stationary structure has occurred among the positions corresponding to the position information.

Specifically, the identification means 22 identifies, among the positions according to the position information, a position of reflection of the reflected light of which the wavelength is equal to or more than a threshold away from the wavelength of the laser light, as an abnormal portion where an abnormality with respect to the stationary structure 400 has occurred. Generally, in a case where damage occurs to the stationary structure 400 such as a steel tower, the damaged portion is likely to shake due to wind or vibration. Therefore, the wavelength of the light reflected by the damaged portion changes due to the Doppler effect. Accordingly, the identification means 22 can identify the position of reflection of the reflected light of which the wavelength is equal to or more than a threshold away from the wavelength of the laser light, as an abnormal portion where an abnormality has occurred with the stationary structure 400. The identification means 22 outputs information indicating the position of the abnormal portion to an external apparatus such as a display, a speaker, or other information processing apparatuses.

Furthermore, the identification means 22 may identify whether the position is an abnormal portion based on the wavelength information corresponding to the wavelength of the reflected light reflected at the same position at different times. Specifically, the acquisition means 21 acquires first wavelength information. In this case, the first wavelength information is wavelength information corresponding to the wavelength of the reflected light reflected at the first position among respective positions. Also, the acquisition means 21 acquires second wavelength information. In this case, the second wavelength information is wavelength information corresponding to the wavelength of the reflected light reflected at the first position after acquiring the first wavelength information. Then, the identification means 22 identifies whether the first position is an abnormal portion based on the difference between the first wavelength information and the second wavelength information.

The first wavelength information and the second wavelength information both refer to the amount of wavelength shift due to the Doppler effect. That is, the difference between the first wavelength information and the second wavelength information indicates the amount of change in the amount of wavelength shift due to the Doppler effect. The identification means 22 can detect that the moving speed at the first position is changing based on the difference between the first wavelength information and the second wavelength information. As explained above, in a case where damage occurs to the stationary structure 400 such as a steel tower, the damaged portion is likely to shake due to wind and vibration. Therefore, the amount of wavelength shift due to the Doppler effect in the light reflected by the damaged portion is different from that of the light reflected by the same portion before the damage occurred. Therefore, for example, in a case where the amount of change in the amount of wavelength shift exceeds a threshold value, the identification means 22 can identify that the position where the laser light is reflected is an abnormal portion, based on the wavelength information (the amount of wavelength shift) corresponding to the wavelength of the reflected light that is reflected at the same location at different times.

The three-dimensional model generating means 23 may perform three-dimensional model generation of the target space 200 using position information. The three-dimensional model is a collection of points whose positions are uniquely determined by the x-axis coordinates, y-axis coordinates, and z-axis coordinates. The three-dimensional model is, for example, a three-dimensional point cloud model. The three-dimensional model generating means 23 generates a model indicating the shape of the stationary structure 400 in the target space 200 by plotting plurality of reflection points RP on the three-dimensional model, based on the relative positions of the reflection points RP with respect to an optical input/output terminal O1. The relative positions of the reflection points RP with respect to the optical input/output terminal O1 are acquired by the acquisition means 21.

The monitoring means 24 monitors the abnormal portion identified by the identification means 22. Specifically, for example, the three-dimensional model generating means 23 continuously performs the process of generating point cloud data. The monitoring means 24 generates the three-dimensional model of the stationary structure 400 using the generated point cloud data. That is, such a three-dimensional model is generated in so-called "real time". The monitoring means 24 displays an image including the generated three-dimensional model on a display (not illustrated). As a result, monitoring of the stationary structure 400 is realized.

At this time, the monitoring means 24 makes an aspect (for example, color) of the portion corresponding to the abnormality occurrence portion in the three-dimensional model different from an aspect (for example, color) of the other portion in the three-dimensional model. As a result, in monitoring the stationary structure 400, intensive monitoring of the abnormality occurrence portion can be realized. As a result, accurate monitoring of the abnormality occurrence portion is realized.

In addition to continuously executing the process of generating point cloud data, the three-dimensional model generating means 23 may also continuously execute the process of measuring the moving speed. The speed of movement is determined from the amount of wavelength shift due to the Doppler effect. The monitoring means 24 may vary the aspect (for example, color) of the abnormality occurrence portion in the three-dimensional model depending on the moving speed of the corresponding point in the point cloud data, based on the results of such measurement. This enables more detailed monitoring of the abnormality occurrence portion.

Note that in the above example, the monitoring means 24 monitors the abnormal portion using point cloud data, but the monitoring means 24 may perform monitoring using a method that does not use point cloud data. Specifically, the monitoring means 24 may perform monitoring by continuing to extract, to the outside, only position information identified as an abnormal portion from among the position information corresponding to each point in the target space 200.

Next, an example of operations of the identification system 1 is explained with reference to FIG. 5.

The light source unit 10 adjusts the emission angle of the laser light (S101). For example, the light source unit 10 adjusts the angle θ1 illustrated in FIG. 3 and the angle θ2 illustrated in FIG. 4 to predetermined angles.

The light emission means 11 of the light source unit 10 emits laser light (S102). As a result, the laser light is reflected at the reflection point RP of the stationary structure 400.

The light receiving means 13 of the light source unit 10 receives laser reflected light (S103). At this time, in a memory (not illustrated) provided in the identification apparatus 20, a time t from when the laser light is emitted to when the reflected laser light is received is stored in association with the emission angle of the laser light. In this case, the light source unit 10 stores the intensity of the reflected laser light in addition to the time t.

The light source unit 10 determines whether the laser light is emitted within a predetermined angle range (S104).

In a case where the laser light is not emitted within the predetermined angle range (No in S104), the light source unit 10 adjusts the emission angle of the laser light (S101). For example, the light source unit 10 changes at least one of the angle θ1 illustrated in FIG. 3 and the angle θ2 illustrated in FIG. 4.

In a case where the laser light is emitted in the predetermined angle range (Yes in S104), the acquisition means 21 acquires, based on laser reflected light, position information corresponding to each position irradiated with laser light and the wavelength information based on the wavelength of reflected light reflected at each position (S105).

The three-dimensional model generating means 23 performs three-dimensional model generation of target space 200 using position information (S106). The identification means 22 identifies an abnormal portion where an abnormality occurs with respect to the stationary structure 400 in the target space 200 based on the position information and the wavelength information (S107). The monitoring means 24 performs monitoring of the abnormal portion (S108).

The identification system 1 has been hereinabove explained. In the identification system 1, the acquisition means 21 acquires, based on the reflected light of the laser light emitted to each position in the target space 200 including the stationary structure 400, the position information corresponding to each position and the wavelength information based on the wavelength of the reflected light reflected at each position. In addition, the identification means 22 identifies, based on the wavelength information, an abnormal portion where an abnormality has occurred with the stationary structure 400 from among the positions irradiated with the laser light. Additionally, the monitoring means 24 performs monitoring of the abnormal portion. As described above, the identification system 1 can identify abnormality occurrence locations with respect to stationary structures. As a result, according to identification system 1, monitoring of abnormality occurrence locations with respect to stationary structures can be realized.

A first modified example embodiment of the identification system 1 according to the first example embodiment is explained. Similar to the identification system 1, the first modified example embodiment of the identification system 1 includes a light source unit 10 and an identification apparatus 20. The light source unit 10 includes light emission means 11 and light receiving means 13. The identification apparatus 20 includes acquisition means 21, identification means 22, three-dimensional model generating means 23, and monitoring means 24.

The first modified example embodiment of the identification system 1 differs from the identification system 1 in that the identification means 22 performs an additional process. In the first modified example embodiment, the identification means 22 identifies that there is a possibility that there is an intruder into the stationary structure.

Specifically, as described above, the identification means 22 identifies a particular position within the target space 200 as an abnormal portion. Hereinafter, "the particular position within the target space 200" is referred to as a "second position". After the identification means 22 identifies the second position as an abnormal portion, the identification means 22 identifies, as an abnormal portion, a position adjacent to the second position from among the positions in the target area. Hereinafter, "the position adjacent to the second position from among the positions within the target area" is referred to as a "third position". In this case, the identification means 22 identifies that there is a possibility that there is an intruder into the stationary structure 400.

For example, it is assumed that by repeating the process of S107 described above, the identification means 22 identifies the second position as an abnormal portion and then identifies the third position as an abnormal portion. In this case, the identification means 22 compares the second position and the third position. The identification means 22 identifies that there is a possibility that there is an intruder into the stationary structure 400 in a case where the distance between the second position and the third position is less than a predetermined value.

In a case where there is an intruder into the stationary structure 400, there is a high possibility that the intruder is moving within target space 200. In this case, the intruder is a moving object that is present at adjacent positions at different times. The identification means 22 is able to identify the position of the moving object as the abnormal portion using the wavelength information based on the wavelength of reflected light. Therefore, the identification means 22 can identify that there is a possibility that there is an intruder into the stationary structure 400 in a case where the second position and third position, which are located within a predetermined distance from each other, are identified as abnormal portions at different times.

A second modified example embodiment of the identification system 1 according to the first example embodiment is explained. Similar to the identification system 1, the second modified example embodiment of the identification system 1 includes a light source unit 10 and an identification apparatus 20. The light source unit 10 includes light emission means 11 and light receiving means 13. The identification apparatus 20 includes acquisition means 21, identification means 22, three-dimensional model generating means 23, and monitoring means 24.

The second modified example embodiment of the identification system 1 differs from the identification system 1 in that the identification means 22 performs an additional process. In the second modified example embodiment, the identification means 22 identifies that there is an object that approaches the stationary structure.

Specifically, as described above, the identification means 22 identifies a particular position within the target space 200 as an abnormal portion. Hereinafter, "the particular position within the target space 200" is referred to as "a fourth position". The identification means 22 identifies a fourth position as an abnormal portion, and then identifies a position closer to the position of the stationary structure 400 than the fourth position as an abnormal portion. Hereinafter, "the position closer to the position of the stationary structure 400 than the fourth position after the fourth position is identified as the abnormal portion" is referred to as a "fifth position". In this case, the identification means 22 identifies that there is an object that approaches the stationary structure 400.

For example, it is assumed that by repeating the process of S107 described above, the identification means 22 identifies the fourth position as an abnormal portion and then identifies the fifth position as an abnormal portion. In this case, the identification means 22 compares the distance from the fourth position to the position of the stationary structure 400 and the distance from the fifth position to the position of the stationary structure 400. Then, the identification means 22 identifies that there is an object that approaches the stationary structure 400 in a case where the distance from the fifth position to the position of the stationary structure 400 is shorter. It is assumed that the position of the stationary structure 400 is given to the identification system 1 in advance by the user or the like.

In a case where there is an object (such as a vehicle) that approaches the stationary structure 400, there is a high possibility that the approaching object is moving in the direction approaching the stationary structure 400 within the target space 200. Therefore, the identification means 22 can identify that there is an object that approaches the stationary structure 400, in a case where the identification means 22 identifies, after identifying the fourth position as an abnormal portion, the fifth position, which is closer to the position of the stationary structure 400 than the fourth position, as an abnormal portion.

A third modified example embodiment of the identification system 1 according to the first example embodiment is explained. Similar to the identification system 1, the third modified example embodiment of the identification system 1 includes a light source unit 10 and an identification apparatus 20. The light source unit 10 includes light emission means 11 and light receiving means 13. The identification apparatus 20 includes acquisition means 21, identification means 22, three-dimensional model generating means 23, and monitoring means 24.

The third modified example embodiment of the identification system 1 differs from the identification system 1 in that the identification means 22 performs an additional process. In the third modified example embodiment, the identification means 22 identifies that an abnormality continuously occurs on the stationary structure.

Specifically, the identification means 22 identifies a particular position within the target space 200 as an abnormal portion. Hereinafter, "the particular position within the target space 200" is referred to as a "sixth position". The identification means 22 identifies the sixth position as an abnormal portion, and then identifies the sixth position as an abnormal portion again. In this case, it is identified that an abnormality is continuously occurring on the stationary structure 400 at the sixth position.

Second Example Embodiment

Figure 6:
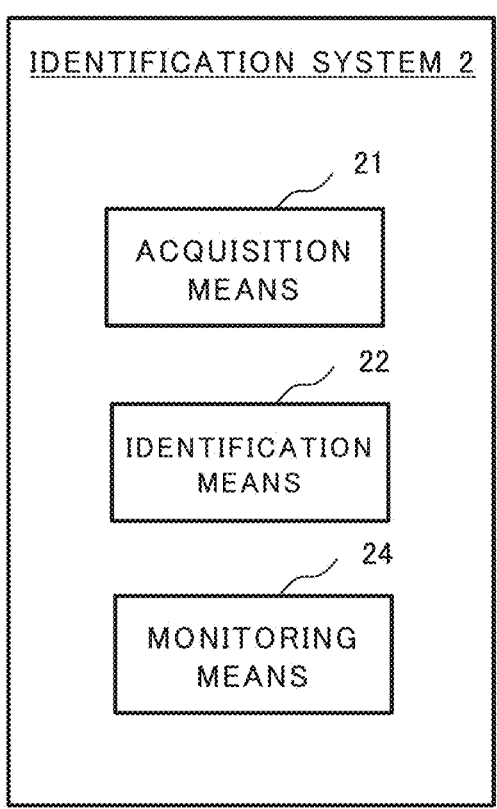
FIG. 6 is a block diagram illustrating a configuration example of the identification system according to the second example embodiment of the present invention.
Figure 7:
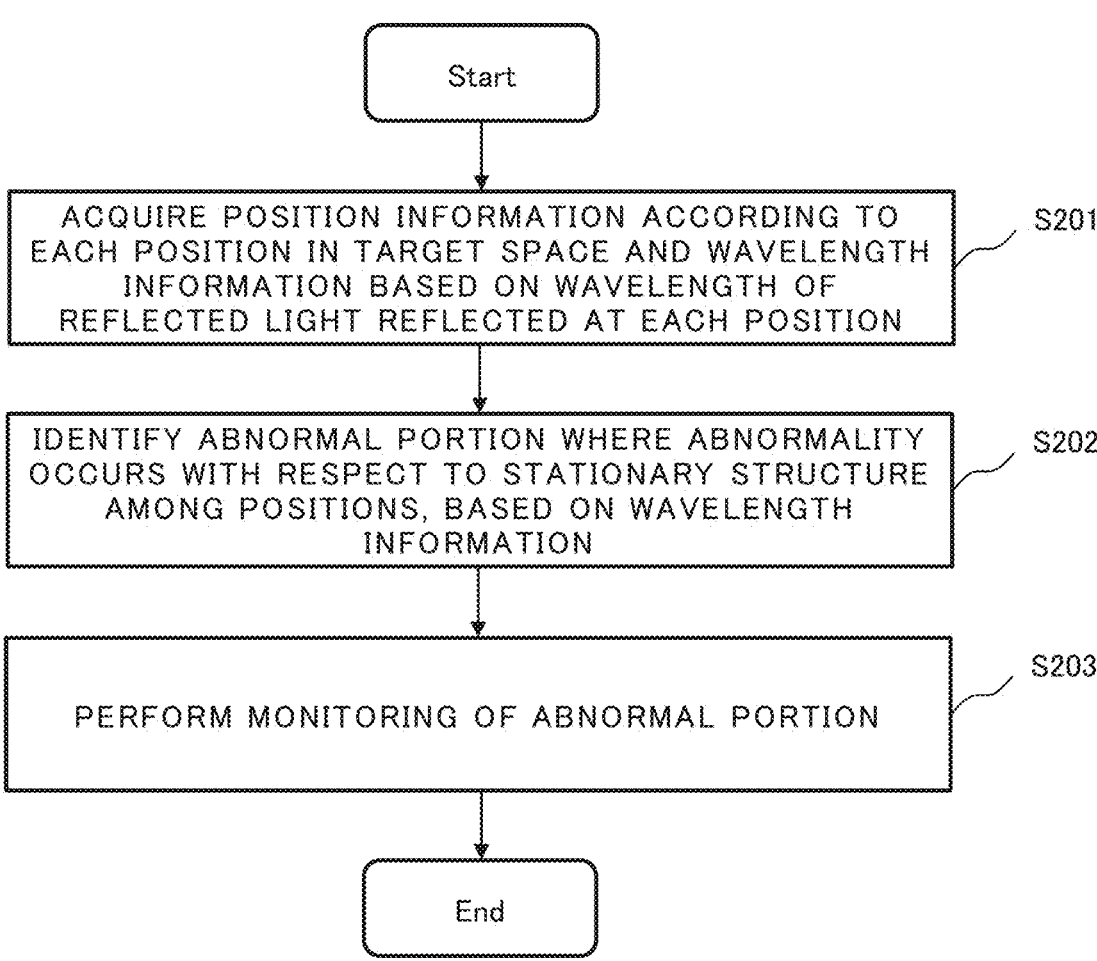
FIG. 7 is a flowchart illustrating an example of operations of the identification system according to the second example embodiment of the present invention.

An identification system 2 according to the second example embodiment is explained with reference to FIG. 6 and FIG. 7. FIG. 6 is a block diagram illustrating a configuration example of the identification system 2. FIG. 7 is a flowchart illustrating an example of operations of the identification system 2.

As illustrated in FIG. 6, the identification system 2 includes acquisition means 21, identification means 22, and monitoring means 24. It is assumed that the light source unit 10 (not illustrated) is provided outside the identification system 2, and that communication with the identification system 2 is possible. The acquisition means 21, the identification means 22, and the monitoring means 24 of the identification system 2 may have functions and connection relationships similar to the acquisition means 21, the identification means 22, and the monitoring means 24 of the identification system 1.

The acquisition means 21 acquires position information corresponding to each position based on the reflected light of the laser light emitted to each position in the target space including the stationary structure. The acquisition means 21 also acquires the wavelength information based on the wavelength of reflected light reflected at each position.

The identification means 22 identifies, based on the wavelength information, the abnormal portion where an abnormality has occurred with respect to the stationary structure from among the positions. Additionally, the monitoring means 24 monitors the abnormal portion identified by the identification means 22.

Next, an example of operations of the identification system 2 is explained with reference to FIG. 7. The example of the operations below corresponds to an identification method. Furthermore, a storage medium may store a program for causing an information processing apparatus to execute processes of the example of the operations below.

The acquisition means 21 acquires the position information corresponding to each position in the target space and the wavelength information based on the wavelength of the reflected light reflected at each position (S201).

The identification means 22 identifies, based on the wavelength information, an abnormal portion where an abnormality has occurred with respect to the stationary structure from among the positions (S202).

The monitoring means 24 performs monitoring of the abnormal portion (S203).

The identification system 2 has been hereinabove explained. In the identification system 2, the acquisition means 21 acquires, based on the reflected light of the laser light emitted to each position in the target space including the stationary structure, position information corresponding to each position and the wavelength information based on the wavelength of reflected light reflected at each position. Furthermore, the identification means 22 identifies, based on the wavelength information, an abnormal portion where an abnormality has occurred with respect to the stationary structure from among the positions irradiated with laser light. Additionally, the monitoring means 24 performs monitoring of the abnormal portion.

Generally, in a case where a stationary structure such as a steel tower is damaged, the damaged portion is likely to shake due to wind or vibration. Therefore, the wavelength of the light reflected by the damaged portion changes due to the Doppler effect. Accordingly, the identification means 22 can identify the abnormal portion where an abnormality occurs with respect to the stationary structure 400 on the basis of the wavelength information based on the wavelength of the reflected light reflected at each position. As described above, the identification system 2 can identify abnormality occurrence locations with respect to stationary structures. As a result, according to identification system 2, monitoring of abnormality occurrence locations with respect to stationary structures can be realized.

Figure 8:
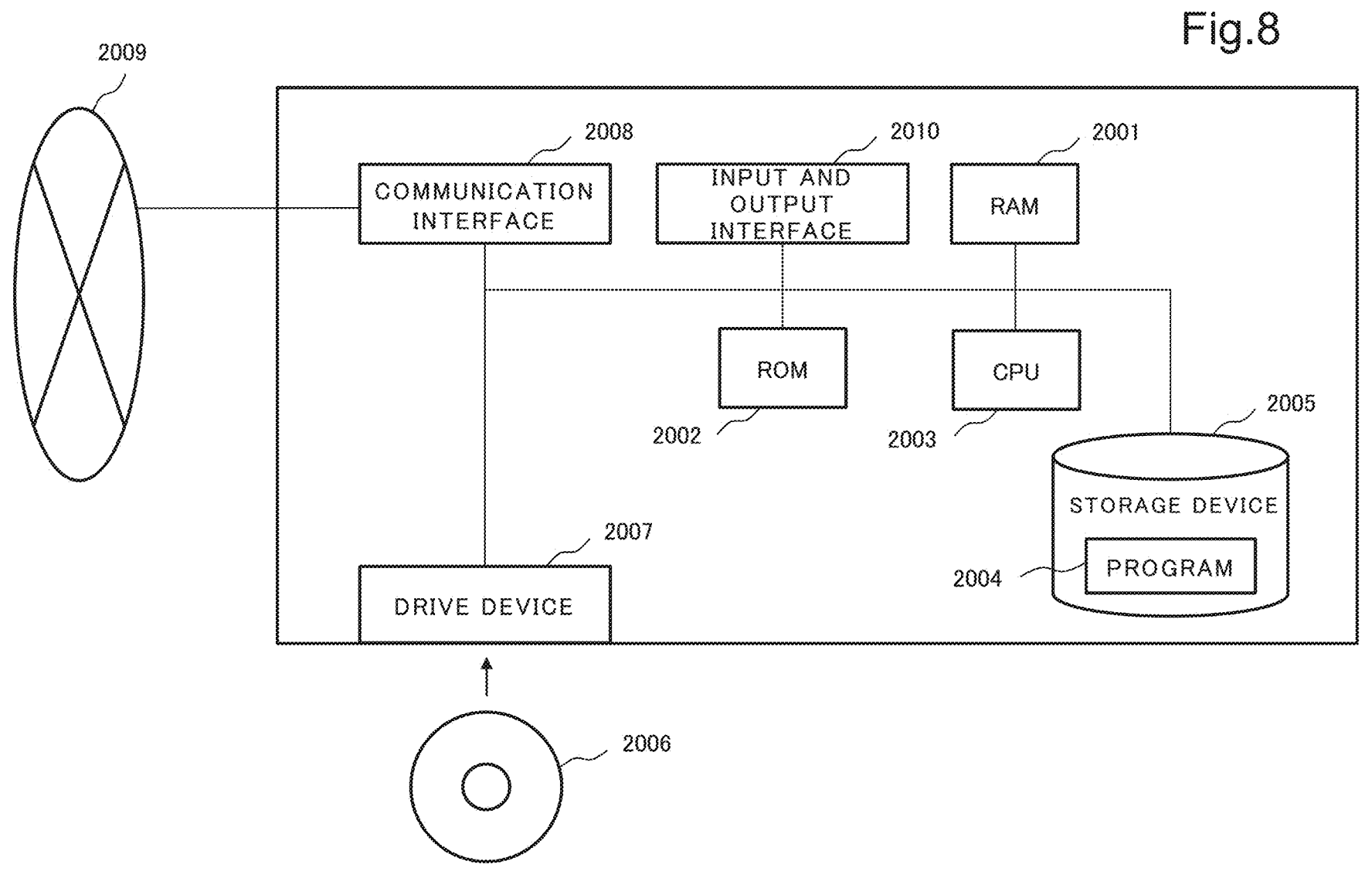

Further, some or all of the constituent elements of each apparatus or system is realized by an arbitrary combination of an information processing apparatus 2000 and a program as illustrated in FIG. 8, for example. FIG. 8 is a diagram illustrating an example of an information processing apparatus that implements the identification systems 1, 2, and the like. The information processing apparatus 2000 includes the following configuration, for example.

Central Processing Unit (CPU) 2001
Read Only Memory (ROM) 2002
Random Access Memory (RAM) 2003
program 2004 loaded to RAM 2003
Storage device 2005 storing program 2004
Drive device 2007 reading and writing recording medium 2006
Communication interface 2008 connecting to communication network 2009
Input and output interface 2010 for inputting and outputting data
Bus 2011 connecting constituent elements The constituent elements of each apparatus according to each example embodiment is realized by the CPU 2001 acquiring and executing the program 2004 that realizes these functions. The program 2004 that realizes the functions of the constituent elements of each apparatus is stored in advance in the storage device 2005 or RAM 2003, for example, and is read out by the CPU 2001 as needed. It should be noted that the program 2004 may be supplied to the CPU 2001 via the communication network 2009, or may be stored in the recording medium 2006 in advance, and the drive device 2007 may read out the program and supply it to the CPU 2001.

There are various modified example embodiments for the implementation method of each apparatus. For example, each apparatus may be realized by any combination of a separate information processing apparatus 2000 and a program for each constituent element. Furthermore, plurality of constituent elements included in each apparatus may be realized by an arbitrary combination of one information processing apparatus 2000 and a program.

In addition, some or all of the constituent elements of each apparatus are realized by general-purpose or dedicated circuitry, including a processor, or a combination thereof. These may be composed of a single chip or plurality of chips connected via a bus. Some or all of the constituent elements of each apparatus may be realized by a combination of the above-mentioned circuitry and the like and a program.

In a case where some or all of the constituent elements of each apparatus is realized by plurality of information processing apparatuses, circuitry, and the like, the plurality of information processing apparatuses, circuitry, and the like may be centrally located or distributed. For example, the information processing apparatuses, circuitry, and the like may be realized as a client-and-server system, a cloud computing system, and the like, in which each is connected via a communication network.

Some or all of the above example embodiments may be described as in the following Supplementary Notes, but are not limited thereto.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1, 2 Identification system
10 Light source unit
11 Light emission means
13 Light receiving means
20 Identification apparatus
21 Acquisition means
22 Identification means
23 Three-dimensional model generating means
2001 CPU
2002 ROM
2003 RAM
2004 Program
2005 Storage device
2007 Drive device
2008 Communication interface
2009 Communication network
2010 Input and output interface
2011 Bus connecting constituent elements

What is claimed is:

1. An identification system comprising:

an acquisition circuit configured to acquire, based on laser light emitted to each position within a target space including a stationary structure and reflected light of the laser light, position information according to the position and wavelength information based on a wavelength of the reflected light reflected at the position;

an identification circuit configured to identify, based on the wavelength information, an abnormal portion where an abnormality occurs with respect to the stationary structure among the positions; and a monitor configured to monitor the abnormal portion, wherein the acquisition circuit is configured to acquire first wavelength information being the wavelength information based on the wavelength of the reflected light reflected at a first position among positions in the target space, wherein the acquisition circuit is configured to, after acquiring the first wavelength information, acquire second wavelength information being the wavelength information based on the wavelength of the reflected light reflected at the first position, and wherein the identification circuit is configured to identify whether the first position is the abnormal portion, based on a difference between the first wavelength information and the second wavelength information.

2. The identification system according to claim 1, further comprising a three-dimensional model generator configured to use the position information and thus generate a shape of the stationary structure in the target space.

3. The identification system according to claim 1, wherein the acquisition circuit is configured to acquire the wavelength information according to a difference between the wavelength of the reflected light and a wavelength of the laser light.

4. The identification system according to claim 1, wherein the identification circuit is configured to identify, as the abnormal portion, a second position among positions within the target space, wherein the identification circuit is configured to, after identifying the second position as the abnormal portion, identify, as the abnormal portion, a third position adjacent to the second position among positions within the target space, and wherein the identification circuit is configured to identify that there is a possibility that there is an intruder into the stationary structure.

5. The identification system according to claim 1, wherein the identification circuit is configured to identify, as the abnormal portion, a fourth position among positions within the target space, wherein the identification circuit is configured to, after identifying the fourth position as the abnormal portion, identify, as the abnormal portion, a fifth position closer to the position of the stationary structure than the fourth position, and wherein the identification circuit is configured to identify that there is an object that approaches the stationary structure.

6. The identification system according to claim 1, wherein the identification circuit is configured to identify, as the abnormal portion, a sixth position among the positions within the target space, wherein the identification circuit is configured to, after identifying the sixth position as the abnormal portion, identify the sixth position as the abnormal portion again, and wherein the identification circuit is configured to identify that an abnormality continuously occurs at the sixth position.

7. An identification method comprising:

acquiring, based on laser light emitted to each position within a target space including a stationary structure and reflected light of the laser light, position information according to the position and wavelength information based on a wavelength of the reflected light reflected at the position;

identifying, based on the wavelength information, an abnormal portion where an abnormality occurs with respect to the stationary structure among the positions;

monitoring the abnormal portion;

acquiring first wavelength information being the wavelength information based on the wavelength of the reflected light reflected at a first position among positions in the target space, after acquiring the first wavelength information, acquiring second wavelength information being the wavelength information based on the wavelength of the reflected light reflected at the first position, and identifying whether the first position is the abnormal portion, based on a difference between the first wavelength information and the second wavelength information.

8. A tangible and non-transitory storage medium storing a program that causes an information processing apparatus to execute:

acquiring, based on laser light emitted to each position within a target space including a stationary structure and reflected light of the laser light, position information according to the position and wavelength information based on a wavelength of the reflected light reflected at the position;

identifying, based on the wavelength information, an abnormal portion where an abnormality occurs with respect to the stationary structure among the positions; and monitoring the abnormal portion;

acquiring first wavelength information being the wavelength information based on the wavelength of the reflected light reflected at a first position among positions in the target space, after acquiring the first wavelength information, acquiring second wavelength information being the wavelength information based on the wavelength of the reflected light reflected at the first position, and identifying whether the first position is the abnormal portion, based on a difference between the first wavelength information and the second wavelength information.

* * * * *